Patented Nov. 4, 1947

2,430,032

UNITED STATES PATENT OFFICE 2,430,032

PROCESSING OF SOLUBLE DIMETHYL SILICONE ELASTIC PRODUCTS PREPARED BY THE USE OF FERRIC CHLORIDE

Donald W. Scott, Schenectady, N. Y., assignor to General Electric Company, a corporation of New York No Drawing. Application November 8, 1944, Serial No. 562,564

6 Claims. (Cl. 260—29)

The present invention relates to the processing of soluble dimethyl silicone elastic products hereinafter referred to as gums prepared by use of an iron halide such as ferric chloride. It is also concerned with the preparation of stable solutions of such gums from which the gum can again be deposited on evaporation of the solvent.

Dimethyl silicone gums can be prepared by treating a liquid dimethyl silicone with an iron halide, such as ferric chloride hexahydrate, as is described and claimed in the copending application of Maynard C. Agens, Serial No. 526,473, filed March 14, 1944, and assigned to the same assignee as the present invention. They may also be prepared by hydrolysis of a dimethyldihalogenosilane by contact with a hydrated iron halide such as ferric chloride hexahydrate as described and claimed in the copending application Serial No. 532,879, filed April 26, 1944, in the name of James G. E. Wright, which application is also assigned to the same assignee as the present invention. The gum products resulting from each of these methods contain substantial quantities of the metal salt employed in their preparation.

When a pure dimethyldihalogenosilane, for example dimethyldichlorosilane or dimethyldibromosilane, or a mixture thereof with a small amount of monomethyltrihalogenosilane such that the methyl-to-silicon ratio is two or only slightly less than two, or a methyl silicone which is preponderantly dimethylsilicone and has a methyl-to-silicon ratio of two or only slightly less than two, is used as a starting material in the preparation of the gums, the resultant gums, also having a methyl-to-silicon ratio of two or only slightly less than two, are soluble in various organic solvents such as toluene, carbon tetrachloride, butyl acetate, etc. These soluble elastic products or gums are firm, solid, and non-sticky. They dissolve slowly in organic solvents, several hours being required for them to go completely into solution, even if the gum is cut up into small pieces and the mixture of gum and solvent is agitated. However, if the gums still contain some of the iron halide catalyst, the solutions are not stable. Upon evaporating the solvent from such a solution there remains, not a solid non-sticky gum, but instead either a liquid silicone oil or a sticky gum much softer than the gum originally dissolved. This is true even if the solution is washed with water to extract the iron halide prior to evaporating the solvent. The failure to recover a solid non-sticky gum from a solution of a soluble dimethylsilicone gum which contains iron halide is believed to be due to depolymerization of the silicone gum caused by the catalytic action of the iron halide on the gum in solution. The depolymerization of the gum containing iron halide in solution seems to be the more serious, the greater the concentration of iron halide in the gum which is dissolved.

The present invention is based on the discovery that this marked depolymerization is either prevented or greatly reduced if the gum containing iron halide is dissolved in a solvent which is vigorously agitated with water or an aqueous solution during the time the gum is dissolving. Under these conditions, the iron halide is continuously extracted from the solution phase by the aqueous phase as the gum dissolves, so that the concentration of iron halide in the solution phase is too low at all times to cause depolymerization of the gum. It seems unimportant what particular aqueous solution is used so long as its constituents do not react with either the solvent or the gum.

Briefly described, the process of the present invention comprises the addition of the soluble, catalyst-containing gum to an agitated two-phase mixture in which one phase is an inert organic solvent, such as toluene, and the other an aqueous phase, preferably water, which does not contain any substance reactive with the gum or solvent. As the gum goes into solution in the solvent it is believed that the catalyst is continuously extracted from the organic phase by the aqueous phase so that the concentration of iron halide catalyst in the solvent phase is too low at all times to cause any appreciable depolymerization of the gum. When the gum has all dissolved in the solvent, the resulting solution is separated from the aqueous phase and washed with water. Evaporation of the organic solvent from this solution gives a solid gum, exhibiting the same elastic, non-sticky properties of the gum used as a starting material.

The following examples will serve to illustrate how the present invention can be carried into effect:

Example 1

Five gram portions of a soluble dimethyl silicone gum containing 2% $FeCl_3.6H_2O$, which had been used in the preparation of the gum, were shaken two days with a two-phase liquid system containing 45 g. of toluene and 50 cc. of each of the following aqueous solutions: (a) water, (b) 1 N HCl, (c) 1 N NaOH. The gum dissolved completely in each case. The solutions of gum were separated from the aqueous phases and the toluene was removed by evaporation. In each case the resulting gum was solid, non-sticky, and indistinguishable in consistency from the original gum. A blank was run in which 5 g. of gum were shaken for the same length of time with 45 g. toluene alone, prior to washing the resulting solution with water. Evaporation of the toluene from this solution left a viscous oil instead of a solid gum.

*Example 2*

The gum used in this example was made by polymerizing octamethylcyclotetrasiloxane $$[(CH_3)_2SiO]_4$$

with 2% $FeCl_3.6H_2O$ at 122°. One hundred parts of this gum were shaken with 600 parts toluene and 600 parts saturated $NaHCO_3$ solution for 4½ hours at room temperature. The gum dissolved completely in the toluene. The two phases were separated by centrifuging and the solution of the gum washed by shaking for one hour with distilled water, followed by centrifuging to separate the water. Removal of the toluene from a portion of this solution gave a solid non-sticky gum. The gum deposited by evaporation of the solvent appeared to be of as high average molecular weight as the original gum.

*Example 3*

Five gram portions of a soluble dimethyl silicone gum containing 1% $FeCl_3.6H_2O$ were shaken with the following pairs of solvents and aqueous phases:

(a) Benzene—water
(b) Chloroform—0.2 N NaOH sol'n.
(c) Dibutyl ether—0.2 M potassium acid phthalate sol'n.
(d) n-Hexane—$H_3BO_3$-NaOH buffer sol'n.
(e) Cyclohexane—tetraethanol ammonium hydroxide sol'n.
(f) Diisobutyl ketone—0.2 N $NH_4OH$ sol'n.
(g) Butyl acetate—$KH_2PO_4$-NaOH buffer sol'n.

In each case 45 g. solvent and 50 cc. aqueous phase were used. After the gum had dissolved, the solutions of gum were separated from the aqueous phases and the solvents were removed by evaporation. In each case a solid, non-sticky gum was obtained. A blank was run in which 5 g. of this same gum were dissolved in benzene, prior to washing the resulting solution with water. Evaporation of the benzene from this solution left a gum which was sticky and definitely softer than the original gum.

The solutions of dimethyl silicone gums described herein with or without fillers, pigments or other modifiers may be used for coating and impregnating fibrous materials such as woven or felted organic and inorganic fabrics or papers or for the production of insulating films on metal conductors and the like. They can also be combined with resinous materials or solutions thereof to obtain coating compositions, films of which possess some of the properties of the silicone gum. Specific compositions of this type containing methyl polysiloxane resins are described and claimed in the copending application Serial No. 562,737, filed November 9, 1944, in the name of A. D. Coggeshall and assigned to the same assignee as the present invention.

What I claim as new and desire to secure by Letters Patent of the United States is:

1. The process which comprises adding a soluble dimethyl silicone elastic product prepared by contacting a liquid dimethyl silicone with ferric chloride to an agitated two-phase mixture of an aqueous phase and an organic solvent for said elastic product which is substantially immiscible with the aqueous phase.

2. The process of preparing a solution of a soluble dimethyl silicone elastic product prepared by contacting a liquid dimethyl silicone with ferric chloride which comprises adding said elastic product to an agitated two-phase mixture of a hydrocarbon solvent and an aqueous phase.

3. The process of processing a soluble dimethyl silicone elastic product prepared by contacting a liquid dimethyl silicone with ferric chloride to render said elastic product stable in solution in an organic solvent which comprises adding the soluble dimethyl silicone elastic product to an agitated two-phase mixture of (1) an organic solvent for said elastic product, which solvent is substantially immiscible with water and (2) an aqueous solution of a compound capable of neutralizing the catalyst.

4. The process of preparing a stable solution of a methyl silicone elastic product prepared by contacting a liquid dimethyl silicone with ferric chloride which comprises adding the dimethyl silicone elastic product to an agitated two-phase mixture of toluene and an aqueous medium.

5. The process of preparing a stable solution of a soluble dimethyl silicone elastic product prepared by contacting a liquid dimethyl silicone with ferric chloride which comprises adding said elastic product to a two-phase mixture of hydrocarbon solvent and a dilute aqueous solution of a soluble alkali.

6. The process of preparing a solution of a soluble dimethyl silicone elastic product prepared by contacting a liquid dimethyl silicone with ferric chloride which comprises adding said elastic product to a mixture of an aromatic hydrocarbon solvent and an aqueous solution of a soluble alkali bicarbonate, separating the aromatic hydrocarbon solution of said elastic product from the aqueous phase and washing said elastic product solution.

DONALD W. SCOTT.